United States Patent [19]

Kelly

[11] Patent Number: 4,692,481

[45] Date of Patent: Sep. 8, 1987

[54] PROCESS FOR MATCHING COLOR OF PAINT TO A COLORED SURFACE

[75] Inventor: Renee J. Kelly, Media, Pa.

[73] Assignee: E. I. Du Pont de Nemours and Company, Wilmington, Del.

[21] Appl. No.: 655,088

[22] Filed: Sep. 27, 1984

[51] Int. Cl.[4] .......... C08K 7/28; C08K 7/00; C08K 3/08; C09D 5/38

[52] U.S. Cl. .......... 523/219; 356/402; 356/405; 523/220; 524/441; 524/494

[58] Field of Search .......... 523/219, 220; 524/441, 524/494; 356/402, 405, 406

[56] References Cited

U.S. PATENT DOCUMENTS

| | | | |
|---|---|---|---|
| 3,052,644 | 9/1962 | Edwards | 260/22 |
| 3,142,583 | 7/1964 | McMahon et al. | 117/62 |
| 3,228,897 | 1/1966 | Nellessen | 260/16 |
| 3,234,038 | 2/1966 | Stephens | 524/441 |
| 3,567,676 | 3/1971 | Herrigel et al. | 260/37 |
| 3,708,318 | 1/1973 | Reinhart et al. | 106/193 M |
| 3,835,087 | 9/1974 | Searight et al. | 260/33.6 R |
| 3,916,168 | 10/1975 | McCarty | 364/526 |
| 4,131,571 | 12/1978 | Crawley et al. | 260/17 R |
| 4,208,465 | 6/1980 | Chang | 428/416 |
| 4,234,653 | 11/1980 | Ballard et al. | 428/328 |
| 4,243,565 | 1/1981 | Nishino | 524/441 |
| 4,311,623 | 1/1982 | Supcoe | 260/18 S |
| 4,330,458 | 5/1982 | Spinelli et al. | 524/512 |
| 4,363,889 | 12/1982 | Hoshino et al. | 523/513 |
| 4,369,063 | 1/1983 | McGowan, Jr. | 106/1.14 |
| 4,378,445 | 3/1983 | Brasen et al. | 524/284 |
| 4,379,196 | 4/1983 | Halper | 428/213 |
| 4,412,744 | 11/1983 | Lee | 356/319 |
| 4,479,718 | 10/1984 | Alman | 356/405 |
| 4,572,672 | 2/1986 | Orchard | 356/446 |

FOREIGN PATENT DOCUMENTS

| | | |
|---|---|---|
| 0057456 | 8/1982 | European Pat. Off. . |
| 2036732 | 12/1970 | France . |
| 57-67784 | 4/1982 | Japan . |
| 58-16945 | 4/1983 | Japan . |

OTHER PUBLICATIONS

Alman, "Directional Color Measurement of Metallic Flake Finishes", paper presented at 1987 Williamsburg Conference of the Inter-Society Color Council, Feb. 11-15, 1987, Williamsburg, Va.

Payne, Organic Coating Technology, vol. II, p. 689, John Wiley & Sons, Inc., New York, 1961.

J. Coat. Technology 54 No. 693, pp. 83-90 (1982), Backhouse.

Bauer et al. Ind. Eng. Chem. Prod. Res. Dev. (1982) 21, pp. 686-690.

Smith, Pigment and Resin Technology pp. 17-20, Oct. 1979.

Smith, Pigment and Resin Technology pp. 16-17, Dec. 1979.

Toyo Aluminum, Polym. Paint Colour J. pp. 796-798, Oct. 29, 1980.

Wojtkowiak, J. Paint Technology 47, No. 609, pp. 79-85 (1975) and 51 No. 658, pp. 111-116 (1979).

C.A. 64: 8487h.

C.A. 78: 73765w.

C.A. 82: 172682h.

C.A. 87: 7393a.

C.A. 88: 172011n.

C.A. 92: 43368t.

*Primary Examiner*—C. Warren Ivy

*Attorney, Agent, or Firm*—Hilmar L. Fricke

[57] ABSTRACT

An improved process for matching the color characteristics of a paint containing film forming binder, a liquid carrier, colored pigments and flake pigments to the color characteristics of a surface layer that contains flake pigments; the improvement comprises the following:

adding to the paint a dispersion comprising a liquid carrier, a dispersing agent and transparent or semitransparent extender pigments or rigid or semirigid organic particles, particularly preferred are, hollow glass spheres, in an amount sufficient to match the color characteristics of the surface layer.

20 Claims, 1 Drawing Figure

F I G. 1
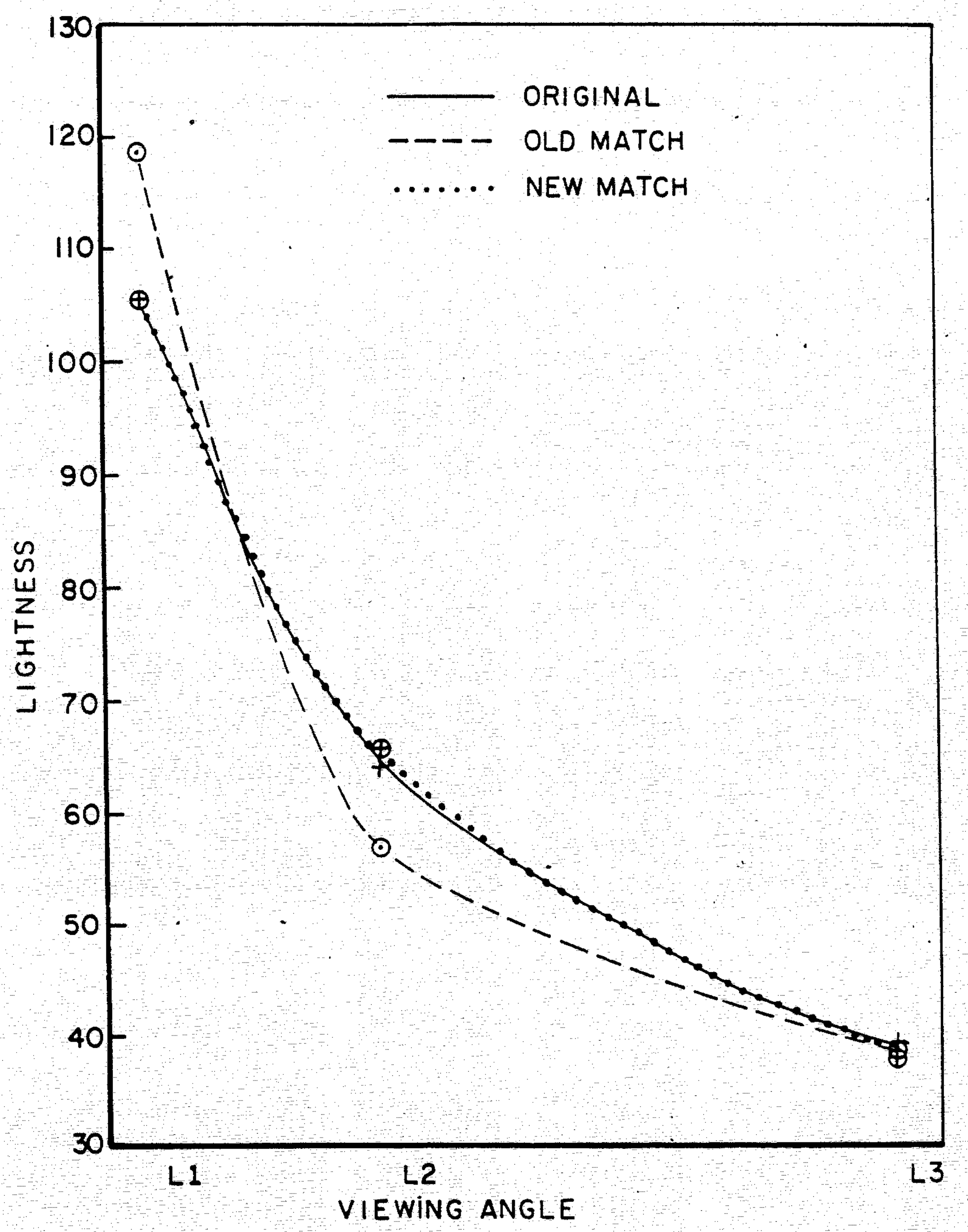

PROCESS FOR MATCHING COLOR OF PAINT TO A COLORED SURFACE

BACKGROUND OF THE INVENTION

This invention is related to color matching a paint to a colored surface and in particular to an improved process for matching a paint containing flake pigments to a painted surface containing flake pigments.

Automobiles and trucks are painted with a wide variety of paints such as acrylic or nitrocellulose lacquers, acrylic, polyurethane, polyester or alkyd enamels and the like. A good color match to the above original paints on repair or refinishing of these paints has been difficult to obtain in some cases. In particular, some paints that contain metallic flake pigments are very difficult to color match since the flake orients itself to the surface of the painted substrate differently with each paint and unless the paint used for refinishing or to make a repair allows the metallic flake pigments to orient in the same manner as in the original paint, the color will not match, particularly, when viewed from different angles. The aforementioned problems occur on refinishing of automobiles and trucks and also at a manufacturing plant where repairs are made at the completion of assembly of the automobile or truck. A method is required that provides for the addition of a composition which changes and randomizes the orientation of the metallic flake in the paint used for refinishing or repair.

The improved process of this invention provides for the addition of the aforementioned composition to paints used for refinishing or repair of automobiles and trucks.

SUMMARY OF THE INVENTION

An improved process for matching the color characteristics of a paint containing film forming binder, a liquid carrier, colored pigments and flake pigments to the color characteristics of a surface layer that contains flake pigments; the improvement comprises the following:

adding to the paint a dispersion comprising a liquid carrier, a dispersing agent and transparent or semitransparent extender pigments or rigid inert organic particles in an amount sufficient to match the color characteristics of the surface layer.

DESCRIPTION OF THE INVENTION

Problems of matching the color characteristics of a repair or refinish paint occur when the finish that is being repaired or refinished is a crosslinked enamel containing flake pigments and the paint used for repair or refinish is a lacquer-like paint. The drying and film shrinkage characteristics of an enamel paint film do not allow flake pigments to become completely oriented in parallel to the surface of the substrate that was painted. The lacquer like repair or refinish paint does allow for a more complete parallel orientation of the flake pigments to the surface. The addition of transparent or semitransparent extender pigments such as glass beads or rigid inert organic particles to the repair or refinish paint provides for random disorientation of flake pigments to the extent necessary to match the color characteristics of the surface being repainted or repaired.

In a typical procedure for matching the color of a refinish or a repair paint to the color of an original finish containing flake pigments that is being repaired or repainted, the pigmentation of the original finish is obtained from known paint formulas, from past experience with the particular paint or from a color computer. Appropriate amounts of tintings which are a dispersion of colored pigments, polymeric dispersants and solvents and flake pigment dispersion are added to an unpigmented clear polymer solution and adjustments are made with tintings to obtain a visual color match. The resulting paint is reduced to a spray viscosity with appropriate solvents and sprayed onto a metal substrate and dried. A visual color comparison to the original finish is made and color values at three angles are made with an absolute spectrophotometer, shown in Lee et al. U.S. Pat. No. 4,412,744 issued Nov. 1, 1983. The flop index also is measured.

Flop index is determined by the following formula $$\frac{K(L_1 - L_3)^a}{L_2^b}$$

where $L_1$ is the head-on brightness value, $L_2$ is the flat angle lightness value, and $L_3$ is the high angle lightness value; each of the above values are measured by the aforementioned spectrophotometer. K, a and b are constants.

These color values and the flop index values are compared to color values of the original finish and a flop index value of the original finish. If an acceptable color match can be obtained, the refinish paint is applied. If a color match cannot be obtained, particularly if the flop index value of the original finish is lower than the flop index value of the refinish paint, the following procedure is used:

As above, the pigmentation is determined. Appropriate amounts of tintings, solvents, flake dispersion and polymer solution are added and then a dispersion comprising liquid carrier, dispersing agent and transparent or semitransparent extender pigments or rigid inert organic particles are added. The composition then is reduced to a spray viscosity and sprayed onto the substrate and dried. Color values, lightness values and flop index value are measured and if necessary additional tintings and/or dispersion of extender pigments or rigid inert organic particles are added to obtain color values and flop index values that match the original finish.

DESCRIPTION OF THE DRAWING

The FIGURE shows three curves which compare color matches to the "original" silver metallic coating of Example 2 using a conventional or "old" repair or refinish composition and a composition according to the instant invention.

The dispersion contains about 5 to 35% by weight of a liquid carrier, 10 to 40% by weight of a dispersing resin or agent and 20 to 60% by weight of extender pigments or rigid inert organic particles. The dispersion is prepared by blending the constituents together and charging them into a sand mill or other dispersing equipment and grinding to form a dispersion.

The liquid carrier of the dispersion can be any of the conventional organic solvents which will keep the dispersing agent, which usually is a resin, soluble. Typical solvents that can be used are amyl acetate, butyl acetate, xylene and mixtures thereof. Water can be used as a solvent if the paint is a water based composition. The dispersing agent then used is water soluble or water dispersible.

The dispersing agent used in the composition preferably is a soluble resin or can be a typical organic dispersing agent. Useful resins contain an acrylic segment such as an alkyl methacrylate like methyl methacrylate, butyl methacrylate, ethyl methacrylate, an alkyl acrylate like butyl acrylate, ethyl acrylate, a hydroxyl containing constituent such as a hydroxy alkyl methacrylate or acrylate like hydroxy ethyl methacrylate, hydroxy propyl methacrylate, hydroxy butyl methacrylate, hydroxy ethyl acrylate, hydroxy propyl acrylate, hydroxy butyl acrylate and the like. Also, the resin can contain an alkyl amino alkyl methacrylate or acrylate such as diethylamino ethyl methacrylate or t-butyl aminoethyl methacrylate.

The resin also contains a drying oil constituent. Typical drying oil constituents that are readily polymerized with the aforementioned acrylic constituents are vinyl oxazoline drying oil esters of linseed oil fatty acids, tall oil fatty acids, tung oil fatty acids and the like.

One preferred resin contains an alkyl methacrylate, alkyl acrylate, hydroxy alkyl acrylate, alkylamino alkyl acrylate and vinyl oxazoline ester of drying oil fatty acids.

Typical transparent or semitransparent extender pigments that are used are coarse and fine barytes, crystalline silica, aluminum silicate, hollow glass spheres, solid glass spheres or mixtures of the above. Also, rigid inert organic particles can be used such as polypropylene, polyethylene, polystyrene and the like. When using these inert organic particles, solvents which swell or otherwise attack the particles cannot be used. Typically, these transparent or semitransparent or rigid inert organic particles have a particle diameter in the range of about 0.1–50 microns.

Preferably, hollow glass spheres are used that have a diameter of about 0.1–50 microns and preferably about 0.1–20 microns and have a specific gravity of about 2–2.5. These beads have a relatively low specific gravity and are resistant to settling out. Particularly preferred are "Zeeospheres" of the type 0/5, 0/8, 0/12, 0/16, 0/20, 0/45, 200, 400, 0/300 and 16/300. These hollow glass spheres are sold by Zeelan Industries, Inc. One preferred type is 200 having a mean diameter, by volume, of about 5.8 microns and a particle size distribution, by volume, of 90% of the particles having 10.8 micron diameter or less, 50% of the particles having 4.7 micron diameter or less, 10% of the particles having 2.3 micron diameter or less.

Typical paints that are used on automobiles and trucks that are repaired with paints matched by the process of this invention are as follows: crosslinked acrylic enamels, aqueous and nonaqueous crosslinked acrylic dispersion enamels, nitrocellulose lacquers, acrylic lacquers and dispersion lacquers, alkyd resin enamels, polyester enamels, polyester urethane enamels and the like.

Typical repair or refinish paints used in this invention containing pigment dispersions or tinting in which pigment is dispersed in the aforementioned resin containing an acrylic segment and drying oil constituents. The paints can be one of the following: acrylic lacquers, such as a lacquer having a binder of an acrylic polymer, cellulose acetate butyrate and a plasticizer, preferred acrylic polymers are the aforementioned acrylic polymer containing an acrylic segment and drying oil constituents and a blend of this polymer and an iminated polymer; another useful acrylic lacquer has a binder of an acrylic polymer having an acrylic segment and drying oil constituent, cellulose acetate butyrate, plasticizer, an iminated acrylic polymer, an acrylic polymer of an alkyl methacrylate and an alkyl acrylate and ethylene vinyl acetate co-polymer; nitrocellulose lacquers, acrylic alkyd enamels such an an enamel of the aforementioned polymer having an acrylic segment and drying oil constituents blended with an alkyd resin and optionally, a polyisocyanate crosslinking agent can be used therein; acrylic enamels such as an enamel having a binder of a hydroxyl containing acrylic resin and a melamine crosslinking agent, acrylic urethane enamels, alkyd urethane enamels of an alkyd resin and a polyisocyanate, alkyd enamels, acrylic polyester enamels such as an enamel having a binder of a hydroxyl containing acrylic resin, a polyester resin and a melamine crosslinking agent or a polyisocyanate crosslinking agent and the like.

Clear coat/color coat finishes on automobiles and trucks can be repaired or refinished with the above paints. The color coat or pigmented coat is matched by the process of this invention and than a clear coat of a conventional lacquer or enamel is applied over the color coat and dried.

Typical acrylic refinish paints that can be used in the process of this invention are shown in Walus et al U.S. Pat. No. 3,488,307 issued Jan. 6, 1970, Donatello et al U.S. Pat. No. 3,553,124 issued Jan. 5, 1971, Willey U.S. Pat. No. 3,711,433 issued Jan. 16, 1973, Meyer U.S. Pat. No. 4,168,249 issued Sept. 18, 1979 and Fry U.S. Pat. No. 4,451,600 issued May 29, 1984. Typical acrylic alkyd refinish paints that can be used are shown in Miller et al U.S. Pat. No. 3,585,160 issued June 15, 1971, Miller U.S. Pat. No. 3,753,935 issued Aug. 21, 1983 and Miller U.S. Pat. No. 3,844,993 issued Oct. 29, 1974. Typical acrylic polyurethane enamels that can be used are shown in Vasta U.S. Pat. No. 3,558,564 issued Jan. 26, 1971 and Crawley et al U.S. Pat. No. 4,131,571 issued Dec. 26. 1978. Typical alkyd resin paints that can be used are shown in Miller U.S. Pat. No. 3,789,037 issued Jan. 29, 1974.

Nitrocellulose lacquers that can be used contain nitrocellulose resin having a viscosity of about $\frac{1}{2}$–6 seconds as the binder. Preferably, a blend of nitrocellulose resins are used. One useful blend contains about 1–20% by weight based on the weight of the binder, of 5–6 second viscosity nitrocellulose and 5–40% by weight, based on the weight of the binder of $\frac{1}{2}$ second nitrocellulose. Optionally, the lacquer can contain about 0.5–15% by weight, based on the weight of the binder, of ester gum and 5–35% by weight of castor oil.

The aforementioned paints contain conventional colored pigments and flake pigments. Typical flake pigments are bright aluminum flake, extremely fine aluminum flake, medium particle size aluminum flake, bright medium coarse aluminum flake and the like, micaflake coated with titanium dioxide pigment also known as pearl pigments. Conventional pigments that are used are titanium dioxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, molybdate orange red, and the like.

The process of this invention can be used to prepare paints at a paint manufacturing plant that will match known colors of paints currently in use on automobiles and trucks. This is known in the paint trade as a "Factory Package". Factory Package paints can be made under controlled process conditions and matched to known colors currently in use. The addition of transparent or semitransparent pigments as discussed above make it possible to obtain color matches to known colors.

The process of this invention also can be used to style paints. Transparent or semitransparent extender pigments such as hollow glass beads are added to a paint containing flake pigments such as aluminum flake or the above pearl pigments in an amount sufficient to obtain the desired glamour for a finish of the paint.

Another aspect of this invention is to add colored pigment dispersions and flake dispersion to a dispersion containing the aforementioned extender pigments in sufficient amounts to match the color characteristics of a surface that is being painted.

The following examples illustrate the invention. All parts and percentages are on a weight basis unless indicated otherwise.

EXAMPLE 1

The following aluminum tinting and polymer solutions were prepared and blended together to form an aluminum premix:

| Aluminum Tinting | Parts by Weight |
|---|---|
| Solvent blend (5% amyl acetate, 23.75% butyl acetate and 71.25% xylene) | 12.3 |
| Thickener solution (3% ethylene glycol, 67% xylene, 10% ammonium bentone, 20% "Antiterra" u wetting agent which is a high molecular weight salt of polycarboxylic acid) | 9.0 |
| Acrylic Resin Dispersion (60% solids of an acrylic vinyl oxazoline ester polymer described in Example 1 of Miller U.S. Pat. No. 3,844,993) | 46.7 |
| Aluminum Flake Paste (70% solids coarse aluminum flake in mineral spirits) | 32.0 |
| Total | 100.0 |

The above constituents were thoroughly blended together to form the aluminum tinting.

| Polymer Solution A | Parts by Weight |
|---|---|
| Butyl acetate | 13.79 |
| Ethylene glycol monoethyl ether acetate | 16.94 |
| Xylene | 13.61 |
| Cellulose acetate butyrate (20 second viscosity) | 3.81 |
| Iminated acrylic polymer solution (40% polymer solids in solvent of an acrylic polymer containing carboxylic acid groups reacted with propyleneimine) | 9.52 |
| E/VA Dispersion (6% solids dispersion in blend of xylene/butyl acetate of ethylene/vinyl acetate copolymer) | 42.33 |
| Total | 100.00 |

The above constituents were thoroughly blended together to form a polymer solution.

| Polymer Solution B | Parts by Weight |
|---|---|
| Butyl acetate | 15.87 |
| Ethylene glycol monoethyl ether acetate | 19.50 |
| Xylene | 15.67 |
| Cellulose acetate butyrate (20 second viscosity) | 3.29 |
| Butyl benzyl phthalate | 2.64 |
| Iminated acrylic polymer solution (described above) | 10.71 |
| Acrylic polymer solution (40% solids of a polymer of 85% methyl methacrylate and 15% butyl acrylate in organic solvent) | 4.88 |
| E/VA Dispersion (described above) | 27.44 |
| Total | 100.00 |

The above constituents were thoroughly blended together to form a polymer solution.

An aluminum premix was prepared by blending the following constituents:

| | Parts by Weight |
|---|---|
| Polymer solution A (prepared above) | 278.42 |
| Polymer solution B (prepared above) | 177.82 |
| Aluminum Tinting (prepared above) | 136.36 |
| Total | 592.60 |

CONTROL PAINT

An aluminum paint was prepared by adding 12.78 parts by weight of the above acrylic resin dispersion used to make the aluminum tinting to 592.6 parts of aluminum premix and thoroughly mixing the acrylic resin dispersion and premix.

The resulting paint had an aluminum pigment volume concentration of 10.9 and an aluminum/binder ratio of about 30/100.

The above paint was reduced to a spray viscosity with conventional thinner solvents and sprayed onto a primed steel panel. A clear composition of an acrylic urethane polymer was then sprayed over the aluminum paint on the panel and dried at ambient temperature for about 8 hours. Readings were taken on the panel with an absolute colorimeter described in U.S. Pat. No. 4,412,744 issued on Nov. 1, 1983 to Lee and Reilly at three different angles, i.e., near specular, flat and high, and are shown respectively as $L_1$, $L_2$ and $L_3$ on the Table. $L_1$ is also known as head on brightness, $L_2$ as flat angle lightness and $L_3$ as high angle lightness. The Flop Index was also calculated. The aluminum paint prepared above which was without extender pigments is the control to which paints containing extender pigments were compared.

A conventional technique for adjusting the Flop Index and lightness of a paint containing flake is to add a dispersion of titanium dioxide pigment. In many cases, titanium dioxide pigment masks the appearance of the aluminum flake at the high angle lightness, L3, and produces a ring like effect which is known as a "bulls eye effect" which is an unacceptable repair for a finish. The following dispersions 2–13 were added to the above aluminum premix at the same pigment volume concentration as the titanium dioxide pigment was added. The lightness values and Flop Index Values were measured and are shown in the Table and can be compared to the values obtained with titanium dioxide pigment.

No. 1 Titanium Dioxide Pigment Dispersion

| White Pigment Dispersion | Parts by Weight |
|---|---|
| Acrylic Resin Dispersion (described above) | 28.88 |
| Organic solvent | 12.73 |
| Titanium dioxide pigment (Particle size up to 3.2 microns and an effective diameter of 0.2 microns) | 56.39 |
| Thickener solution (described above) | 2.00 |
| Total | 100.00 |

The above constituent are charged into a sand mill and ground to form a uniform dispersion.

The following constituents are mixed together to form a white tinting:

| White Tinting | Parts by Weight |
|---|---|
| White Pigment Dispersion (prepared above) | 89.00 |
| Acrylic Resin Dispersion (described above) | 9.45 |
| Organic solvent | 1.55 |
| Total | 100.00 |

36.04 parts by weight of the above white tinting are added to 592.6 parts by weight of the aluminum premix prepared above to provide a titanium dioxide pigment volume concentration of 4.5 and an aluminum/binder weight ratio of 30/100. The resulting composition was reduced to a spray viscosity and sprayed onto a primed steel panel. A clear composition of an acrylic urethane was sprayed over the above applied composition and dried at ambient temperatures as above and color measurements were made and are recorded in the Table. Versus the control, the measurements show a decrease in head on brightness, $L_1$, an increase in flat angle lightness, $L_2$, and a large increase in high angle lightness $L_3$ and a decrease in Flop Index. These data show that by using titanium dioxide pigment, a large increase in high angle lightness, $L_3$, is obtained and in general a good color match using titanium dioxide pigment cannot be expected.

| No. 2 Coarse Barytes Dispersion | Parts by Weight |
|---|---|
| Acrylic Resin Dispersion (described above) | 345.1 |
| Organic solvent | 103.6 |
| Barytes extender Pigment (coarse-particle size up to 80 microns and having an effective diameter of 8 microns) | 1251.3 |
| Total | 1700.0 |

The above constituents were charged into a sand mill and ground to form a dispersion.

28.18 parts by weight of the above barytes dispersion and 7.05 parts by weight of the acrylic resin dispersion, described above, were added to 592.6 parts by weight of the aluminum premix prepared above to provide a barytes pigment volume concentration of 4.5 and an aluminum/binder weight ratio of 30/100. The resulting composition was reduced to a spray viscosity and sprayed onto a primed steel panel. A clear composition of an acrylic urethane was sprayed over the applied composition and dried at ambient temperatures as above and color measurements were made and are recorded in the Table. The measurements in comparison to the control show a decrease in head on brightness, $L_1$, an increase in flat angle lightness, $L_2$, and an increase in high angle lightness, $L_3$, but not as great as with titanium dioxide and a decrease in the Flop Index. The above data, in particular the high angle lightness data, indicates that a better color match can be made using barytes dispersion in comparison to a titanium dioxide pigment dispersion.

NO. 3 LOW MICRON BARYTES DISPERSION

The dispersion is prepared the same as above coarse barytes dispersion except low micron barytes extender pigment having a weight average particle size of 0.3 to 30 microns having an effective diameter of 6 microns was used for the coarse barytes extender pigment.

As above, the low micron barytes dispersion was added in the same amount to the acrylic resin dispersion and to the aluminum premix prepared above and the resulting composition was reduced to a spray viscosity and sprayed onto a steel panel. A clear composition of an acrylic urethane was sprayed over the applied composition and dried at ambient temperatures as above and color measurements were made and are recorded in the Table. The results are similar to those of the above aluminum paint containing coarse barytes extender pigment but the low micron barytes dispersion did not move the $L_1$, $L_2$, $L_3$ and Flop Index Values as far as the coarse barytes.

| No. 4 Aluminum Silicate Dispersion | Parts by Weight |
|---|---|
| Acrylic Resin Dispersion (described above) | 314.8 |
| Organic solvent | 159.8 |
| Aluminum silicate extender pigment (particle size up to 20 microns and having an effective diameter of 3 microns) | 660.4 |
| Total | 1135.0 |

The above constituents were charged into a sand mill and ground to form a dispersion.

20.63 parts by weight of the above aluminum silicate dispersion and 7.06 parts by weight of the acrylic resin dispersion, described above were added to 592.6 parts by weight of the aluminum premix prepared above to provide an aluminum silicate pigment volume concentration of 4.5 and an aluminum/binder weight ratio of 30/100. The resulting composition as reduced to a spray viscosity and sprayed onto a primed steel panel. A clear composition of an acrylic urethane was sprayed over the applied composition and dried at ambient temperatures as above and color measurements were made and are recorded in the Table. The measurements in comparison to the control show a slight decrease in head on brightness, $L_1$, only a slight increase in flat angle lightness, $L_2$, and a slight increase in high angle lightness, $L_3$. The Flop Index decreased only slightly. The above data indicates that only a slight change can be obtained for $L_1$, $L_2$ and $L_3$ values using aluminum silicate due to its small particle size.

| No. 5 Glass Bead Dispersion | Parts by Weight |
|---|---|
| Acrylic Resin Dispersion (described above) | 28.88 |
| Organic solvent | 12.73 |
| Thickener solution (described above) | 2.00 |
| "Zeeospheres" 0/5 Hollow Glass Beads (having a diameter of 0.1-5 microns and an average, by weight, diameter of 2.0 microns and a specific gravity of 2.4) | 56.39 |
| | 100.00 |

The above constituents were charged into a sand mill and ground to form a dispersion.

19.79 parts by weight of the above glass bead dispersion and 7.0 parts by weight of the acrylic resin dispersion were added to 592.6 parts by weight of the aluminum premix prepared above to provide a glass bead pigment volume concentration of 4.5 and an aluminum/binder weight ratio of 30/100. The resulting composition was reduced to a spray viscosity and sprayed onto a primed steel panel. A clear composition of an acrylic urethane was sprayed over the applied composition and dried at ambient temperatures as above and color measurements were made and are recorded to the Table. The measurements in comparison to the control showed a decrease in head on brightness, $L_1$, an increase in flat angle lightness, $L_2$, and a slight increase in high angle lightness, $L_3$ and a decrease in Flop Index. The above data, in particular the high angle lightness data, indicates that a better color match could be obtained using a glass bead dispersion in comparison to a titanium dioxide pigment dispersion.

Seven additional glass bead dispersions were prepared using the above constituents to form the dispersion, except the following glass beads were used in place of the "Zeeospheres" 0/5 Hollow Glass Beads:

| | |
|---|---|
| No. 6 "Zeeospheres" 0/8 | Diameter 0.1-8 microns, Weight Average Diameter 3 microns Sp. Gr. 2.3 |
| No. 7 "Zeeospheres" 0/12 | Diameter 0.1-12 microns, Weight Average Diameter 4 microns Sp. Gr. 2.2 |
| No. 8 "Zeeospheres" 0/16 | Diameter 0.1-16 microns, Weight Average Diameter 6 microns Sp. Gr. 2.1 |
| No. 9 "Zeeospheres" 0/20 | Diameter 0.1-20 microns, Weight Average Diameter 8 microns Sp. Gr. 2.0 |
| No. 10 "Zeeospheres" 0/45 | Diameter 0.1-45 microns, Weight Average Diameter 12 microns Sp. Gr. 2.0 |
| No. 11 "Zeeospheres" 0/300 | Diameter 0.1-300 microns, Weight Average Diameter 16 microns Sp. Gr. 2.0 |
| No. 12 "Zeeospheres" 16/300 | Diameter 16-300 microns, Weight Average Diameter 38 microns Sp. Gr. 2.0 |

Each of the above dispersions were formulated into a paint using the same constituents as used to form aforementioned aluminum paint except one of the above glass bead dispersions were substituted for the No. 5 Glass Bead dispersion. In each case, the resulting composition was reduced to a spray viscosity and sprayed onto a primed steel panel and a clear composition of an acrylic urethane was sprayed over the applied composition and dried at ambient temperatures and color measurements were made and recorded in the Table. In general, the measurements in comparison to the control had decreased head-on brightness, $L_1$, an increase in flat angle lightness, $L_2$, and an increase in high angle lightness, $L_3$. Flop Index and lightness values showed that as the glass bead sizes increase, $L_1$ values decrease, $L_2$ values increase, $L_3$ values increase and Flop Index Values decrease. In general, the high angle lightness data indicates that a better color match can be obtained by using glass bead dispersions than titanium dioxide pigment dispersions.

| No. 13 Crystalline Silica Dispersion | Parts by Weight |
|---|---|
| Acrylic Resin Dispersion (described above) | 10.94 |
| Organic solvent blend | 6.60 |
| Crystalline Silica (Particle size of up to 120 microns having a density of 2.65 g/cm$^2$ and an effective diameter of 10 microns) | 22.98 |
| Total | 40.52 |

The above constituents were charged into a sand mill and ground to form a dispersion.

21.95 parts of the above silica dispersion and 6.85 parts by weight of the acrylic resin dispersion were added to 592.6 parts by weight of the aluminum premix prepared above to provide a silica pigment volume concentration of 4.5 and an aluminum to binder content weight ratio of 30/100. A clear composition of an acrylic urethane was sprayed over the applied composition and dried at ambient temperatures as above and color measurements were made and are recorded in the Table. The measurements in comparison to the control showed a decrease in head on brightness, $L_1$, an increase in flat angle lightness, $L_2$, an increase in high angle lightness, $L_3$ and a decrease in the Flop Index. The above data indicates that a better color match can be obtained with silica dispersion than can be obtained with a titanium dioxide pigment dispersion.

TABLE

| Paints | Pigment | Absolute Colorimeter Readings | | | Flop Index |
|---|---|---|---|---|---|
| | | L1 | L2 | L3 | |
| Control | None | 140.42 | 56.05 | 34.11 | 14.98 |
| 1 | Titanium Dioxide | 128.41 | 59.49 | 43.58 | 11.08 |
| 2 | Coarse Barytes | 124.26 | 66.23 | 38.36 | 10.24 |
| 3 | Low Micron Barytes | 133.58 | 60.69 | 35.75 | 12.76 |
| 4 | Aluminum Silicate | 138.34 | 56.99 | 35.22 | 14.27 |
| 5 | Zeeosphere 0/5 | 134.39 | 59.69 | 34.97 | 13.17 |
| 6 | Zeeosphere 0/8 | 134.52 | 59.72 | 35.16 | 13.16 |
| 7 | Zeeosphere 0/12 | 131.84 | 60.75 | 35.82 | 12.48 |
| 8 | Zeeosphere 0/16 | 133.41 | 60.81 | 35.62 | 12.73 |
| 9 | Zeeosphere 0/20 | 130.74 | 62.40 | 36.16 | 12.00 |
| 10 | Zeeosphere 0/45 | 129.66 | 62.93 | 36.55 | 11.70 |
| 11 | Zeeosphere 0/300 | 127.37 | 63.76 | 37.94 | 11.07 |
| 12 | Zeeosphere 16/300 | 125.92 | 63.93 | 38.23 | 10.80 |
| 13 | Crystalline Silica | 124.73 | 65.38 | 38.71 | 10.37 |

EXAMPLE 2

A color match to a silver metallic enamel was prepared by conventional techniques.

The following dispersions first were prepared:

| Medium Coarse Aluminum Flake Dispersion | Parts by Weight |
|---|---|
| Organic solvent blend | 13.60 |
| Thickener solution (described in Example 1) | 4.50 |
| Aluminum flake paste (60% solids coarse aluminum flake in mineral spirits) | 31.50 |
| Acrylic resin dispersion described in Example 1) | 50.40 |
| Total | 100.00 |

The above constituents are charged into a mixing vessel and thoroughly blended to form a dispersion.

| Carbon Black Dispersion | Parts by Weight |
|---|---|
| Acrylic resin dispersion (described in Example 1) | 55.65 |
| Organic solvent blend | 33.35 |
| Peptized carbon black lake pigment | 11.00 |
| Total | 100.00 |

The above constituents are charged into a mill and ground with steel media to form a dispersion.

| Carbon Black Tinting | Parts by Weight |
|---|---|
| Acrylic resin dispersion (described in Example 1) | 80.45 |
| Organic solvent blend | 15.21 |
| Carbon black dispersion | 4.34 |
| Total | 100.00 |

The above constituents were blended together.

The following paint was formulated using conventional techniques in an attempt to match the color of the silver metallic enamel.

| | Parts by Weight |
|---|---|
| Medium Coarse Aluminum Flake Dispersion (prepared above) | 7.56 |
| Aluminum Tinting (prepared in Example 1) | 7.56 |
| White Tinting (8.90 parts by weight of a white pigment dispersion prepared in Example 1, 78.33 parts by weight of an acrylic resin dispersion described in Example 1, and 12.77 parts by weight of a solvent blend) | 3.51 |
| Carbon Black Tinting (prepared above) | 0.75 |
| Polymer Solution A (described in Example 1) | 26.73 |
| Polymer Solution B (described in Example 1) | 53.89 |
| Total | 100.00 |

The above constituents were thoroughly blended together and reduced to a spray viscosity and sprayed onto a primed steel panel. A clear composition of an acrylic urethane was sprayed over the applied composition and dried at ambient temperatures and color measurements were made as in Example 1 and recorded and a curve drawn on the FIGURE of the Drawing. The FIGURE of the Drawing has a curve of the values of the original silver metallic enamel being color matched. As shown on the FIGURE of the Drawing, an exact color match was not obtained. To obtain an acceptable color match the two curves should coincide.

The Flop Index Value was 10.9 for the above composition and for the original silver metallic enamel was 7.8.

A second paint was formulated using the technology of this invention.

The following dispersions first were prepared:

| Transparent Yellow Oxide Dispersion | Parts by Weight |
|---|---|
| Acrylic resin dispersion (described in Example 1) | 62.99 |
| Organic Solvent Blend | 12.41 |
| Transiron Oxide Yellow Pigment | 24.60 |
| Total | 100.00 |

The above constituents are charged into a media mill and thoroughly ground to form a dispersion.

| Yellow Tinting | Parts by Weight |
|---|---|
| Acrylic Resin Dispersion (described in Example 1) | 6.72 |
| Transparent Yellow Oxide Dispersion (prepared above) | 85.28 |
| Organic Solvent Blend | 8.00 |
| Total | 100.00 |

The above constituents were thoroughly blended together to form the tinting.

| Monastral Blue Dispersion | Parts by Weight |
|---|---|
| Acrylic Resin Dispersion (prepared above) | 33.08 |
| Organic Solvent | 51.92 |
| "Monastral" Blue Pigment | 15.00 |
| Total | 100.00 |

The above constituents were charged into a media mill and ground to form a dispersion.

| Blue Tinting | Parts by Weight |
|---|---|
| Monastral Blue Dispersion (prepared above) | 70.78 |
| Acrylic Resin Dispersion (prepared above) | 28.72 |
| Organic Solvent | 0.50 |
| Total | 100.00 |

The above constituents were thoroughly blended together to form the tinting.

| Medium Particle Size Aluminum Flake Dispersion | Parts by Weight |
|---|---|
| Organic solvent | 19.80 |
| Thickener solution (described in Example 1) | 2.00 |
| Acrylic Resin Dispersion (described in Example 1) | 46.20 |
| Medium particle size aluminum flake (65% solids in mineral spirits) | 32.00 |
| Total | 100.00 |

The above constituents are thoroughly mixed together to form a dispersion.

The second paint was prepared by blending together the following constituents:

| | Parts by Weight |
|---|---|
| Carbon black tinting (prepared above) | 6.90 |
| Medium Coarse Aluminum Flake Dispersion (prepared above) | 6.28 |
| Medium Particle Size Aluminum Flake Dispersion (prepared above) | 4.71 |
| White Tinting (described above) | 1.88 |
| Yellow Tinting (prepared above) | 0.08 |
| Blue Tinting (prepared above) | 0.02 |
| No. 9 Glass Bead Dispersion (prepared in Example 1) | 5.89 |
| Polymer Solution A (described in Example 1) | 31.86 |
| Polymer Solution B (described in Example 1) | 42.38 |
| Total | 100.00 |

The above constituents were thoroughly blended together and reduced to a spray viscosity and sprayed onto a primed steel panel. A clear composition of an acrylic urethane was sprayed over the applied composition and dried at ambient temperatures and color measurements were made as in Example 1 and recorded on the graph of the FIGURE of the Drawing. As the graph shows, an almost exact color match was obtained with the second paint. Both curves almost are superimposed.

Flop Index Value was 7.9 in comparison to the Silver Metallic Enamel which was 7.8.

I claim:

1. An improved process for visually matching the color characteristics at at least three viewing angles of a dried paint film formed from a wet paint comprising film forming binder, a liquid carrier of solvent or water, colored pigments and flake pigments to the color characteristics of a surface layer that contains flake pigments: wherein the improvement comprises adding to the wet paint a dispersion comprising a liquid carrier of solvent or water, a dispersing agent and extender pigment consisting of hollow glass spheres having a diameter of about 0.1–50 microns in an amount sufficient for a dried film of the paint to match the color characteristics of the surface layer.

2. The process of claim 1 in which the flake pigments are metallic flake pigments.

3. The process of claim 2 in which the metallic flake pigments are aluminum flake.

4. The process of claim 1 in which the dispersing agent comprises an acrylic resin.

5. The process of claim 4 in which the acrylic resin comprises an acrylic vinyl oxazoline ester polymer consists essentially of an alkyl methacrylate, alkyl acrylate, hydroxy alkyl acrylate or methacrylate, alkylamino alkyl acrylate and vinyl oxazoline ester of drying oil fatty acids.

6. The process of claim 1 in which the flake pigments are aluminum flake, the liquid carrier is an organic solvent and the dispersing agent comprises an acrylic vinyl oxazoline ester polymer consisting of an alkyl methacrylate, an alkyl acrylate, hydroxy alkyl acrylate or methacrylate, an alkyl amino alkyl acrylate and vinyl oxazoline ester of drying oil fatty acids.

7. The process of claim 1 in which color characteristics are measured at three different angles with an absolute spectrophotometer and the flop index is determined for the surface layer and the same values for the dried paint are determined and necessary adjustments made by adding the dispersion to the paint to match the color characteristics and flop index of the surface layer.

8. The process of claim 1 in which the binder of the paint comprises a mixture of an acrylic polymer containing reactive hydroxyl groups and a polyisocyanate.

9. The process of claim 1 in which the binder of the paint comprises an alkyd resin.

10. The process of claim 1 in which the binder of the paint comprises a blend of an alkyd resin and a polyisocyanate.

11. The process of claim 1 in which the binder of the paint comprises nitrocellulose having a viscosity of about 1/2–6 seconds.

12. The process of claim 1 in which the binder of the paint comprises an acrylic polymer, cellulose acetate butyrate and an iminated acrylic polymer.

13. The process of claim 1 in which the binder of the paint comprises an acrylic polymer having drying oil constituents, cellulose acetate butyrate, an organic plasticizer and an iminated acrylic polymer.

14. The process of claim 1 in which the binder of the paint comprises an acrylic polymer having acrylic segments and drying oil constituents, cellulose acetate butyrate, an organic plasticizer, an iminated acrylic polymer, an acrylic polymer of an alkyl methacrylate and an alkyl acrylate and ethylene vinyl acetate copolymer.

15. The process of claim 1 in which the binder of the paint comprises an acrylic polymer having acrylic segments and drying oil constituents, cellulose acetate butyrate, an iminated acrylic polymer, and ethylene vinyl acetate copolymer.

16. The process of claim 15 in which the binder of the paint contains a polyisocyanate crosslinking agent.

17. The process of claim 1 in which the binder of the paint comprises an acrylic resin, a urethane resin and a melamine crosslinking agent or a polyisocyanate crosslinking agent.

18. The process of claim 1 in which the paint comprises an acrylic polymer containing reactive hydroxyl groups and a melamine crosslinking agent.

19. The process of claim 1 in which the paint comprises an acrylic polymer containing reactive hydroxyl groups, a polyester resin and a melamine crosslinking agent or a polyisocyanate crosslinking agent.

20. The process of claim 1 in which the surface layer comprises a color coat containing flake pigments and a clear coat layer in adherence to the color coat.

* * * * *